United States Patent

Schöppe

Patent Number: 5,861,984
Date of Patent: Jan. 19, 1999

[54] CONFOCAL SCANNING MICROSCOPE AND BEAMSPLITTER THEREFOR

[75] Inventor: Günter Schöppe, Jena, Germany

[73] Assignee: Carl Zeiss Jena GmbH, Jena, Germany

[21] Appl. No.: 757,920

[22] Filed: Nov. 27, 1996

Related U.S. Application Data

[63] Continuation-in-part of Ser. No. 625,831, Apr. 1, 1996, Pat. No. 5,701,198.

[30] Foreign Application Priority Data

Mar. 31, 1995 [DE] Germany .......................... 195 11 937.1
Jun. 5, 1996 [DE] Germany ....................... 296 09 959 U

[51] Int. Cl.⁶ ............................. G02B 21/06; G02B 27/14
[52] U.S. Cl. ........................ 359/385; 359/368; 359/638
[58] Field of Search ................................... 359/227–235, 359/368, 385, 389, 494–496, 500, 580, 583–585, 601–613, 629–640, 597–598, 831–837

[56] References Cited

U.S. PATENT DOCUMENTS

| | | | |
|---|---|---|---|
| 3,844,638 | 10/1974 | Lingenfelder et al. | 359/638 |
| 4,896,952 | 1/1990 | Rosenbluth | 359/638 |
| 4,927,254 | 5/1990 | Kino et al. | 359/368 |
| 5,067,805 | 11/1991 | Corle et al. | 359/235 |
| 5,237,442 | 8/1993 | Khoe et al. | 359/638 |
| 5,701,198 | 12/1997 | Schoppe | 359/371 |

FOREIGN PATENT DOCUMENTS

| | | | |
|---|---|---|---|
| 4306374 | 9/1994 | Germany | 359/375 |
| 4-104217 | 4/1992 | Japan | 359/385 |
| 5-127097 | 5/1993 | Japan | 359/638 |

Primary Examiner—Thong Nguyen
Attorney, Agent, or Firm—Walter Ottesen

[57] ABSTRACT

The invention is directed to a confocal scanning microscope for viewing an object. The confocal scanning microscope includes an illuminating device for transmitting an illuminating beam along an illuminating beam path and an optic for defining an imaging beam path. A beamsplitter is mounted in the imaging beam path and has a partially reflecting layer for deflecting a component of the illuminating beam toward the object whereby the component is reflected back toward the beamsplitter and passes through the beamsplitter into the imaging beam path with unwanted reflections occurring within the beamsplitter. The beamsplitter has two prisms conjointly defining the partially reflecting layer and has an external form defined by the optical faces of the prisms with each two mutually adjacent ones of the optical faces conjointly defining an angle unequal to 90° whereby the unwanted reflections are substantially prevented from entering the imaging beam path.

5 Claims, 3 Drawing Sheets

CONFOCAL SCANNING MICROSCOPE AND BEAMSPLITTER THEREFOR

RELATED APPLICATION

This is a continuation-in-part application of my U.S. patent application having Ser. No. 08/625,831, filed on Apr. 1, 1996, and entitled "Confocal Incident Light Microscope", now U.S. Pat. No. 5,701,198.

BACKGROUND OF THE INVENTION

For incident light arrangements in microscopy, splitter elements are utilized for illumination and these splitter elements can be configured as splitter mirrors or splitter cubes. In both configurations, reflections occur at the boundary surfaces which lead to disturbances for various microscopic investigative techniques. In addition, inclined splitter mirrors diminish the quality of the image in convergent and divergent beam paths.

The splitter element is mounted in the divergent region of the imaging beam path in confocal direct-view microscopes. For this reason, both disadvantages occur when utilizing splitter mirrors. When utilizing splitter cubes, it is only necessary to do something about the reflections.

Of the in-radiated light, only a small percentage range (0.5 to 4%) returns from the object as useful light in the confocal direct-view microscopy. All reflections are superposed on the image and cause a contrast-reducing veil. Experience has shown that even reflections having an intensity of $10^{-4}$ of the maximal useful intensity can still be disturbing.

In U.S. Pat. No. 5,067,805, an effort was made to solve this problem by rotating a beam-splitter cube about a diagonal axis passing through the cube. In this way, the beams are so displaced that the arrangement no longer provides symmetry. The adjustment of such an arrangement is difficult and requires complex ancillary devices.

The use of a polarizing beamsplitter to avoid reflections, as disclosed in U.S. Pat. Nos. 4,927,254 or 4,896,952, constitutes a disturbance for anisotropic objects which are arbitrarily mounted in the microscopic beam path, that is, are not aligned to the polarized light.

SUMMARY OF THE INVENTION

In view of the above, it is an object of the invention to improve the extent to which reflection in a confocal scanning microscope is avoided.

The confocal scanning microscope of the invention is for viewing an object and includes: an illuminating device for transmitting an illuminating beam along an illuminating beam path; optic means for defining an imaging beam path; a beamsplitter mounted in the imaging beam path and having a partially reflecting layer for deflecting a component of the illuminating beam toward the object whereby the component is reflected back toward the beamsplitter and passes through the beamsplitter into the imaging beam path with unwanted reflections occurring within the beamsplitter; and, the beamsplitter having two prisms conjointly defining the partially reflecting layer and having an external form defined by the optical faces of the prisms with each two mutually adjacent ones of the optical faces conjointly defining an angle unequal to 90° whereby the unwanted reflections are substantially prevented from entering the imaging beam path.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
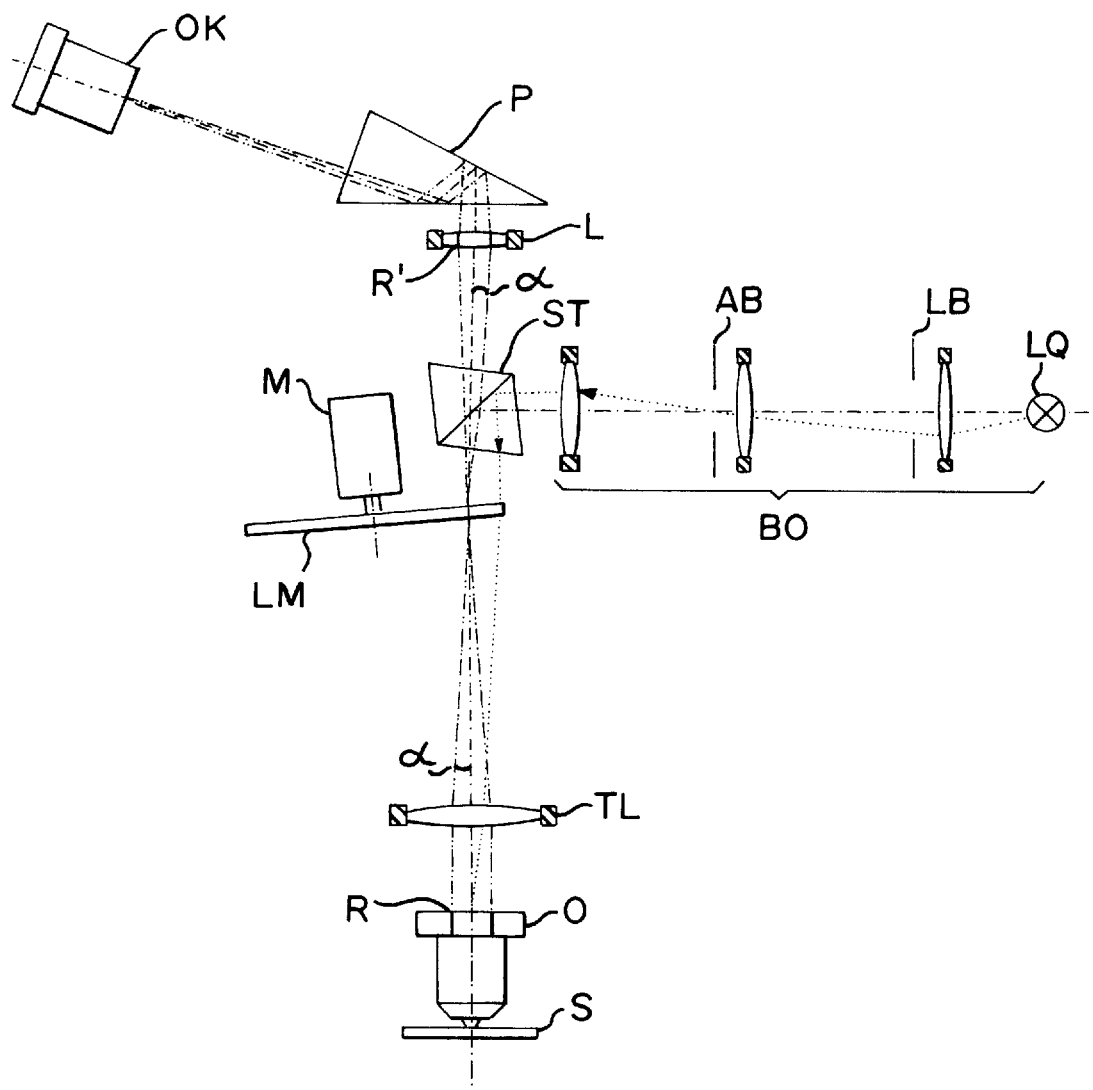
FIG. 1 is a schematic showing the beam path of a confocal scanning microscope according to the invention.

FIG. 1 shows an illuminating optic BO comprising a light source LQ, a field stop LB and an aperture stop AB. The illuminating beam is guided via a beamsplitter ST in the direction of a perforated mask LM such that an image of the field stop LB is formed on the upper side of the perforated mask LM. The perforated mask is mounted so as to be inclined in the beam path and is configured in the manner of a Nipkow disc. The perforated mask LM and field stop LB are imaged by a tube lens TL and an objective O into the plane of an object S being viewed. The object, in turn, is return imaged on the perforated mask LM (confocal imaging).

The perforated mask LM is driven in rotational movement by a motor M so that the aperture pattern disposed thereon moves over the object plane. The rays reflected from the object S pass again through the apertures of the perforated mask LM and pass through the beamsplitter ST. The plane of the perforated mask LM is imaged with the image of the object S via a lens L and a Bauernfeind prism P into an ocular OK.

The angle $\alpha$ is the aperture angle of the imaging optic and is here determined from the peripheral edge R of the optically effective surface of the objective O and the angle $\alpha$ approximately corresponds to the effective aperture angle of the radiation from the perforated mask LM in the direction L'. The last-mentioned aperture angle is determined by the peripheral edge R' of the lens L.

Figure 2:
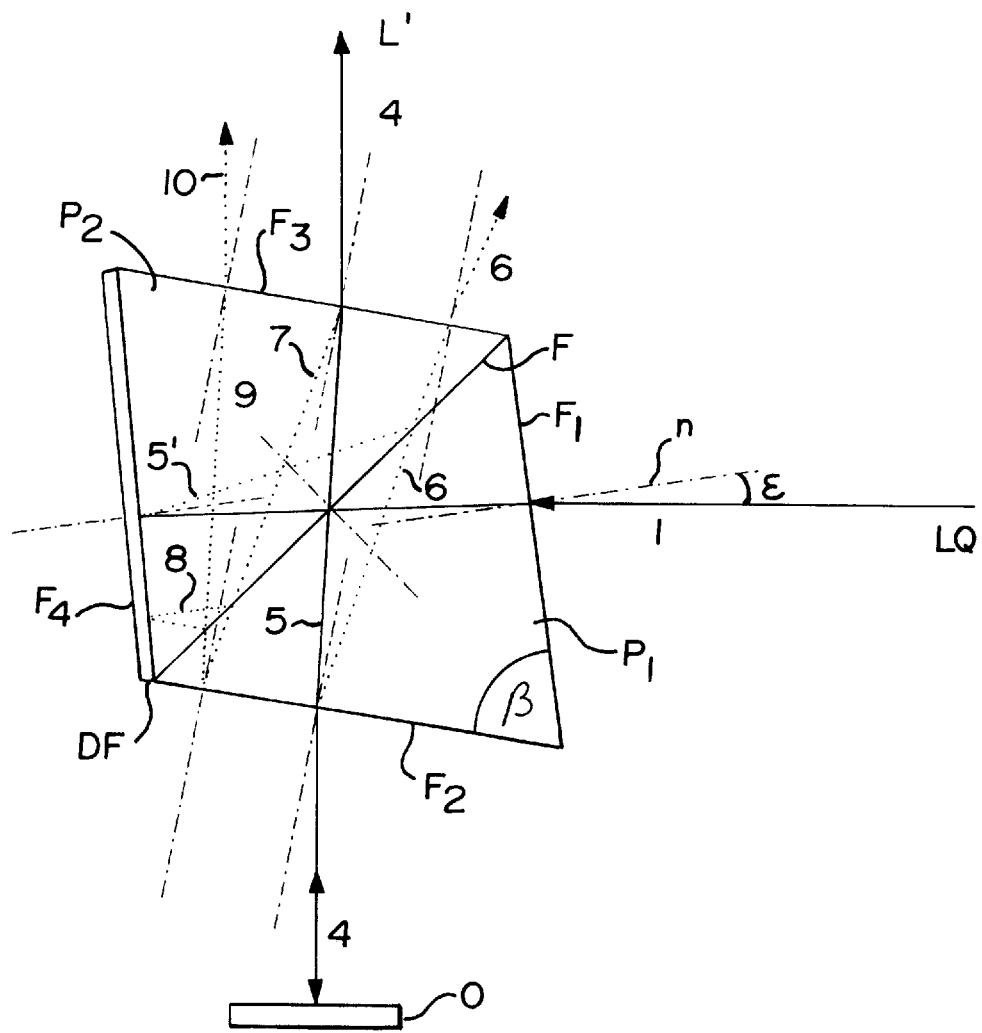
FIG. 2 is a schematic showing the trace of different component beams in beamsplitter ST; and, FIG. 3 is a schematic of a confocal direct-view microscope equipped with glass wedges arranged forward and rearward of a Nipkow disc.

The beamsplitter ST is shown in FIG. 2 and has an entry face F1 having a surface normal n which encloses an acute angle $\epsilon$ with the optical axis of the light beam 1 incident from the direction of the light source LQ.

The angle $\beta$ is conjointly defined by the faces F1 and F2 of a prism P1 of the beamsplitter ST and is unequal to 90 degrees; whereas, the splitter face F maintains its usual angular position to the optical axis of the light beam 1 which is here 45 degrees.

According to the invention, a beamsplitter is mounted in the beam path of a confocal scanning microscope wherein the outer form of the beamsplitter deviates from the usual cubic form, or parallelepiped form, in which the angle $\beta$ is 90 degrees. The incident light 1 enters into the beamsplitter ST having the splitter surface F and is reflected in the direction of the objective O as a component beam 5. A part 6 of the light is reflected at the exit face F2. This component exits at the imaging side face F3 of the beamsplitter ST in a direction which, in the confocal direct-view microscope, is greater than the aperture angle $\alpha$ and is no longer detected by downstream components in the beam path. A component of the incident light, which passes through the splitter layer of the splitter face F, incidents as beam 5' on the outer face F4 of the beamsplitter. A dark attenuating filter DF is cemented to the outer face F4. The adhesive has a refractive index which is adapted so that the reflection occurring at this face is attenuated to a very great extent. The beam 4 returning from the object S has a significantly lower intensity than the illuminating beam 1. The beam 4 is reflected to a small extent in the form of beam 7 at the face F3 and passes through the splitter layer F or is reflected at this layer. Thereafter, the beam is reflected at the lower surface F2 of the prism P1 as beam 9 and again passes through the splitter layer F and reaches the viewing beam path, laterally displaced, as beam 10.

The component of the beam 7, which is reflected at the splitter face F, reaches the face F4 as beam 8. The intensity of these beam components is reduced so greatly by the double reflection at the glass/air surfaces and by the two-time passthrough through the splitter layer that it is no longer disturbing.

For a normally configured cube or parallelepiped-shaped splitter cube, reflections occur for the beams 5 and 5' which still exhibit disturbing intensities even when the boundary faces are coated to be antireflectant.

If a beamsplitter ST is so configured that the angle of inclination of the normal of the outer faces to the optical axis is somewhat greater than ⅔ of the aperture angle α, then the disturbing primary reflections 5, 5' can be reflected out of the beam path without deteriorating the image quality because of the inclination of the faces. The normal of the outer surface to the optical axis is dependent upon the position of the prism in the beam path of the optical instrument. Secondary reflections again run in the direction of the useful light but have such a high intensity loss that they no longer are a disturbance. This is because of the double passthrough or the double reflection at the splitter layer and the double reflection at the outer side. In the embodiment shown, the two prisms P1 and P2 have the same geometric form and both define an isosceles triangle.

The form of the beamsplitter is not restricted to the embodiment shown.

Especially, the angle between the faces F1 and F2 and the angle between faces F3 and F4 need not be equal so that the beamsplitter comprises two non-identical glass prisms (P1, P2) which are separated by a splitter layer. The position of the unwanted beams (10, 6) can be determined because of the form of the prisms (P1, P2).

The triangle in the section shown defined by the faces F1, F2 and the splitter face F is an isosceles triangle as shown; however, it is also conceivable with side lengths of F1 and F2 which are different, that is, not as an isosceles triangle and not as a right triangle.

A Nipkow disc is disposed inclined in the beam path and this beam path is optically again aligned to the axis by the glass wedges. In combination with this Nipkow disc, the inclined splitter cube furthermore effects the compensation of the slight lateral splitting of the image into spectral colors. This splitting arises because of the dispersion at the wedges.

Figure 3:
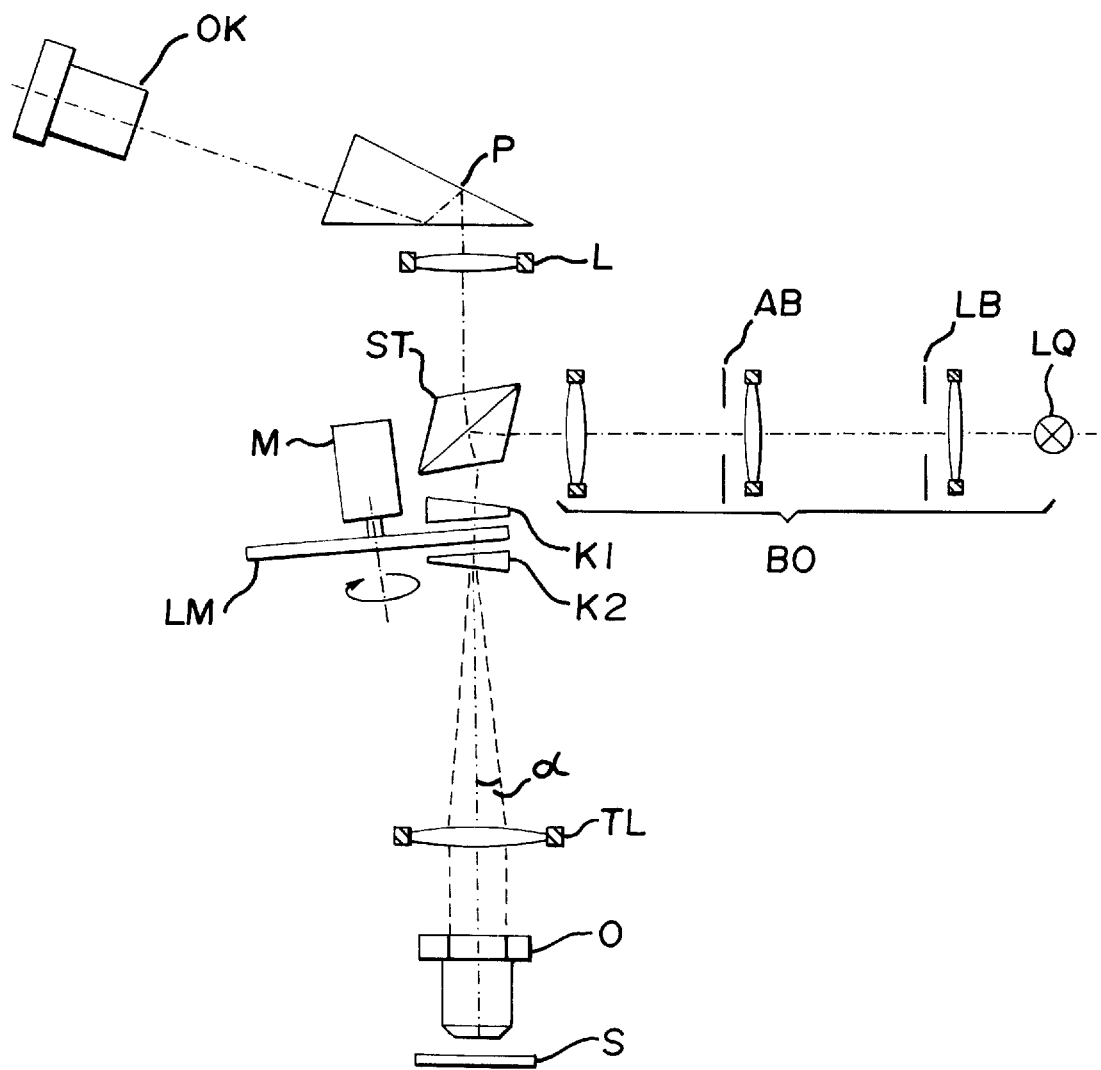

An arrangement of this kind wherein two glass wedges (K1, K2) are arranged, respectively, forward of and rearward of the Nipkow disc, is shown in FIG. 3, and in the parent patent application Ser. No. 08/625,831 referred to initially herein.

The invention is not restricted to the embodiment shown.

In the embodiment shown, the illuminating beam path is deflected into the direction of the specimen. The light reflected from the specimen passes through the beamsplitter into the imaging beam path. On the other hand, the beamsplitter can deflect the imaging beam path in the direction of an imaging plane. The illuminating beam path reaches the specimen via the beamsplitter. This latter case is shown, for example, in FIG. 7 of U.S. Pat. No. 4,927,254 incorporated herein by reference.

In the context of the invention, the most different variations with respect to the configuration of the beamsplitter are conceivable within the scope of the invention. These variations result from the specifically selected optical arrangement and the conditions resulting therefrom with respect to the aperture angle of the imaging optics used as well as the selected position of the primary and secondary disturbing rays which are to be deflected.

The precise form of the beamsplitter can be advantageously determined in combination with the optical elements mounted forward or rearward thereof such as the glass wedges shown in FIG. 3 in order to coact with these components with respect to the avoidance of reflection such as disturbing light reflections of the perforated mask.

It is understood that the foregoing description is that of the preferred embodiments of the invention and that various changes and modifications may be made thereto without departing from the spirit and scope of the invention as defined in the appended claims.

What is claimed is:

1. A confocal scanning microscope for viewing an object, the confocal scanning microscope comprising:

an illuminating device for transmitting an illuminating beam along an illuminating beam path;

optic means for defining an imaging beam path;

a beamsplitter mounted in said imaging beam path and having a partially reflecting layer for deflecting a component of said illuminating beam toward the object whereby said component is reflected back from the object toward said beamsplitter and passes through said beamsplitter into said imaging beam path with unwanted reflections occurring within said beamsplitter;

said beamsplitter including two prisms having optical faces and said two prisms each having the geometrical form of an isosceles triangle and conjointly defining said partially reflecting layer;

said beamsplitter having an external form defined by the optical faces of said prisms with each two mutually adjacent ones of said optical faces conjointly defining an angle unequal to 90° whereby said unwanted reflections are substantially prevented from entering said imaging beam path; and, a perforated rotatable mask mounted between said beamsplitter and said optic means in said beam path so as to be inclined with respect to said beam path.

2. The confocal scanning microscope of claim 1, wherein one of said optical faces toward said illuminating device; said illuminating beam path and a normal to said one optical face conjointly defining a first angle; said optical means defining a first aperture angle opening in the direction toward said beamsplitter and a second aperture angle opening in the direction toward said object; and, said first angle being more than ⅔ greater than at least one of said first and second aperture angles.

3. The confocal scanning microscope of claim 1, wherein said prisms are configured to impart a rhombic external shape to said beamsplitter.

4. The confocal scanning microscope of claim 1, wherein said perforated rotatable mask is a Nipkow disc.

5. The confocal scanning microscope of claim 1, further comprising:

a first prism having a first wedge-shaped section arranged in said beam path between said beamsplitter and said perforated rotatable mask; and, a second prism having a second wedge-shaped section arranged in said beam path between said perforated rotatable mask and said optic means.

* * * * *